Sept. 12, 1967 B. L. CORDRY ETAL 3,341,849

SELF-CALIBRATING, SELF-TESTING RADIO ALTIMETER

Filed Jan. 26, 1966 4 Sheets-Sheet 1

BURTON L. CORDRY
RUY L. BRANDAO
NICHOLAS M. PAPANICOLAOU
INVENTORS

BY Killman & Lamb
ATTORNEYS

BURTON L. CORDRY
RUY L. BRANDAO
NICHOLAS M. PAPANICOLAOU
INVENTORS

Killman & Lamb
ATTORNEYS

Sept. 12, 1967 B. L. CORDRY ETAL 3,341,849

SELF-CALIBRATING, SELF-TESTING RADIO ALTIMETER

Filed Jan. 26, 1966 4 Sheets-Sheet 3

BURTON L. CORDRY
RUY L. BRANDAO
NICHOLAS M. PAPANICOLAOU
INVENTORS

BY Killman & Lamb
ATTORNEYS

SELF-CALIBRATING, SELF-TESTING RADIO ALTIMETER

Filed Jan. 26, 1966

BURTON L. CORDRY
RUY L. BRANDAO
NICHOLAS M. PAPANICOLAOU
INVENTORS

BY Killman & Lamb
ATTORNEYS

United States Patent Office 3,341,849
Patented Sept. 12, 1967

3,341,849

SELF-CALIBRATING, SELF-TESTING RADIO ALTIMETER

Burton L. Cordry, Glenarm, Ruy Lopes Brandao, Baltimore, and Nicholas M. Papanicolaou, Lutherville, Md., assignors to The Bendix Corporation, Baltimore, Md., a corporation of Delaware Filed Jan. 26, 1966, Ser. No. 523,201
16 Claims. (Cl. 343—14)

ABSTRACT OF THE DISCLOSURE

An FM/CW radio altimeter including a variable frequency filter whose pass-band varies in response to the magnitude of the signal representing the echoing target distance so as to act, in essence, as an automatic volume control. The variable frequency filter includes a series RC circuit wherein diodes separate various individual resistors parallel connected comprising the R of the filter circuit, which diodes become successively conductive as signal strength increases so as to decrease effective R, thereby changing the filter time constant and hence filter band-pass width.

Additionally, self-calibrating and self-testing provisions are provided including a means for maintaining transmitter rate of frequency change constant comprising a closed loop wherein transmitter frequency is mixed with transmitter frequency delayed by a fixed time delay to produce a low frequency signal whose magnitude is a measure of rate of change of frequency. A departure of this low frequency signal from a predetermined value generates an error signal which is applied to correct the rate of transmitter frequency change.

Various of the self-testing provisions include filters and tuned circuits sensing the frequency spectrum at critical points in the circuit, the absence of proper frequencies causing warning flags to appear on an instrument panel.

Where frequency counters are used to generate a voltage representative of a frequency, dual channels are employed with the output of the channels being compared to ensure proper operation of each element in said channels.

The present invention relates to radio altimeters for aircraft. More particularly it relates to radio altimeters of the FM/CW type and is especially characterized by the provision of means for insuring accuracy and operability continuously during use.

Radio altimeters of the FM/CW type, for example, as described in U.S. Patent 2,247,662 to Newhouse, have gained a favored commercial position because of the advantages residing therein. Among these advantages are the fact that an FM/CW altimeter measures altitude as a direct function of frequency. This eliminates time references, as required in pulse systems and such errors as may arise from pulse width variations and the like.

With the reduction of measurements strictly to those of frequency it is possible to achieve excellent resolution. The elimination of time references permits simultaneous and continuous measurement of the altitude of several real or artificial reflection points. This property is employed in the present invention to permit continuous calibration and self-adjustment throughout the operating range of the instrument. Accuracy is tested by measuring the indicated altitude of an artificial delay loop corresponding to a certain fixed altitude and comparing this response with a reference. The result should be equality or a null between the two. If such is not the case and the difference does not exceed certain tolerances, the difference is employed as an input signal to a servo circuit which adjusts the average slope of the modulation characteristic to that required to produce a null.

The achievement of accuracy alone in an operable instrument is not in itself sufficient if the instrument is to be used as an integral part of an automatic landing system. The aircraft pilot must be forewarned of any failure of the instrument which would cast doubt on the validity of its indication. Accordingly another object of the invention is to provide an altimeter capable of detecting faults within itself and of indicating the existence of such faults. This self-testing or integrity monitoring is accomplished continuously during use and encompasses every part of the instrument including antennas, cables and indicators.

Further, since the integrity monitoring means may itself fail and thus permit an instrument fault to exist without warning, another object of the invention is to provide means giving warning of the failure of the self-test means. This object is accomplished by providing duplicate test circuits, the outputs of which should always be in agreement for a perfectly operating system. If the outputs should disagree beyond a tolerable amount, the difference is detected and caused to actuate an alarm.

As an additional guarantee of confidence in the system, another object of the invention is to provide all the integrity monitoring means with fault detectors which are fail-safe.

Other objects, including the elimination of step or fixed error and the provision of manual test means in addition to the self-test means, will become evident as an understanding of the invention is gained through study of the following detailed description and the accompanying drawings.

Briefly, the invention is an improvement upon known FM/CW altimeters using triangular modulation in which a small portion of the transmitter output is coupled to an artificial delay line and thence to circuits which duplicate those of the main altimeter channel to produce an error signal. The error signal is fed back negatively to the frequency modulator to bring the altimeter into precise calibration.

Integrity monitoring is accomplished by providing a duplicate circuit for generating the modulator control voltage and a detector for warning of disagreement between the output of the circuit actually controlling the modulation and the output of its duplicate. The integrity of the main altimeter channel is monitored by means of a frequency counter which duplicates the main frequency counter and includes means for detecting disagreement between the two. The integrity of the servo-type indicator is monitored by a detector which tests for an active null at the servo-motor input. Connecting cables, antennas and the receiver are monitored by a circuit which has as its input the signal which leaks from the transmitter antenna directly into the receiver antenna and then appears at the receiver output. Means are provided for distinguishing actual failure of the instrument from failure due to the signal loss which occurs at altitudes beyond the range of the instrument or because of excessive aircraft roll. The outputs of all the various fault detectors are combined in a single warning circuit which produces a warning unless every element of the instrument is operating properly.

In the drawings:

FIG. 1 is a functional block diagram of the altimeter of the invention;

FIG. 2, located on the sheet containing FIG. 5, is a block diagram of the warning and flag alarm functions of the invention;

Figure 1:
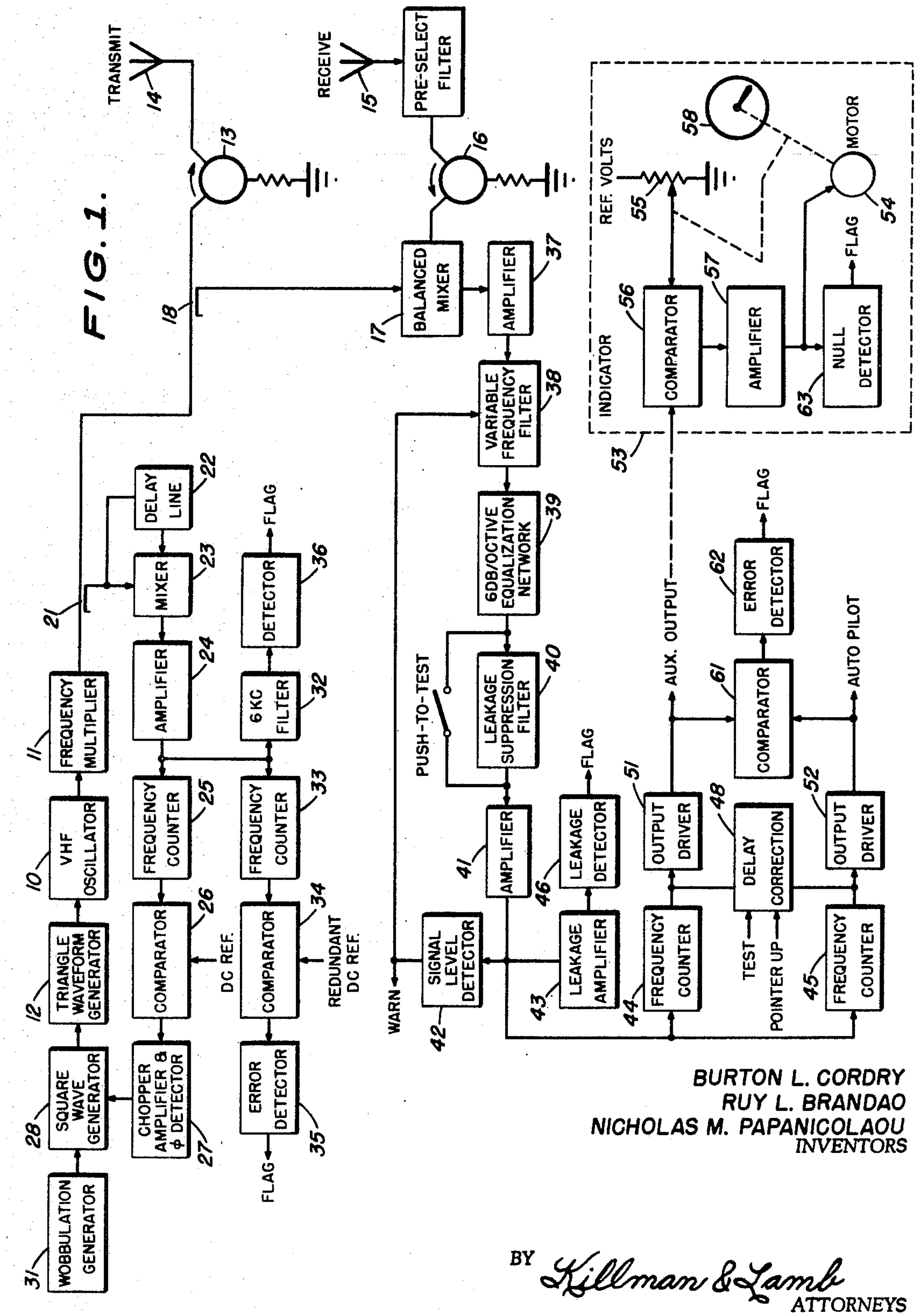

Referring to FIG. 1, the altimeter of the invention comprises an oscillator 10 and frequency multiplier 11 for producing an R.F. carrier in the C band of microwave frequencies, suitably at 4300 mc./s. The oscillator 10 may be voltage controlled to produce a varying frequency in response to a modulating voltage, or other of the conventional means for modulating its frequency may be employed. The frequency is caused to vary linearly as a function of the output voltage of a triangular waveform generator 12. The frequency modulated carrier from multiplier 11 is fed through a circulator 13 to a transmitting antenna 14. The transmitted signal, upon reflection from the ground, is returned to a receiving antenna 15 aboard the aircraft. The received signal is applied to a preselector filter which rejects interfering signals from ground radars and other sources, thence through a circulator 16 to a balanced mixer 17.

Frequency conversion of the received signal is accomplished in mixer 17 by beating a small portion of the outgoing signal, taken from a directional coupler 18, with the incoming signal. The resulting difference frequency signal from mixer 17 is proportional to the altitude of the aircraft and by converting this frequency to an analog voltage in a frequency counter circuit, an indication of aircraft altitude is obtained.

The foregoing elements and their mode of operation are conventional features in prior altimeters. In practical instruments, the indicated altitude is very likely to be incorrect as a result of crossover error, step error, modulation non-linearities and Doppler error. The existence of crossover error and step error has been recognized in the art. Crossover error results at the times the triangular modulating wave is near its peak values. Then the outgoing and incoming signals approach one another in frequency and the difference frequency drops momentarily to zero. This source of error is virtually eliminated by choosing the period of the triangular modulating wave to be much greater than the maximum transit time of signal from the aircraft to the earth and return.

Step error is caused by the inability of frequency counter circuits to respond to fractional portions of a cycle of the difference frequency signal. The actual altitude of the aircraft may be above or below the indicated aircraft altitude an amount equal to the distance represented by one cycle of the difference frequency. Step errors are commonly eliminated by modulating or "wobbulating" the frequency of the triangular modulating wave. The frequency counter output will then be in error both above and below the correct value, but upon averaging the results a sufficiently close approximation to the correct value is obtained.

Doppler errors are of such nature that as long as the modulation of the transmitter is linear, equal but opposite Doppler frequency shifts will occur during one modulation cycle. Consequently the average value of the indicated altitude will not be in error.

An important feature of the present invention is the provision of means for continuously adjusting the frequency v. time relationship in the transmitter to insure accurate altitude indications during use and throughout the range of the instrument.

The audio beat frequency in an FM/CW altimeter is given by:

$$fa=\frac{2H}{C}\frac{\Delta F}{\Delta T}$$

where $fa$ is the audio beat frequency
H is the altitude of the aircraft
C is the velocity of propagation; and
$\Delta F/\Delta T$ is the rate of change of the transmitter frequency.

This equation shows $fa$ to be a linear function of H so long as the slope $\Delta F/\Delta T$ of the modulation characteristic remains constant. While, in the present invention, the instantaneous slope of the modulation characteristic may vary during a modulation cycle, the average value of the slope taken over several modulation cycles is contant and therefore the average value of $fa$, for several modulation cycles, is a function of H alone.

The means for maintaining the average slope of the transmitter modulation constant appear in FIG. 1, commencing with a directional coupler 21. The coupler 21 extracts a small portion of the transmitter output power and applies the same to a delay line 22 and as one input to a balanced mixer 23. The output of mixer 23, is an audio frequency determined by the modulation characteristic of the transmitter and the amount of delay in delay line 22. Since the delay is constant, practically, departure of the audio frequency from a fixed value results only from non-linearity in the modulation characteristic. The audio output of mixer 23 is amplified in an amplifier 24 and applied to a frequency counter 25. The counter 25 produces an output voltage proportional to the input frequency and the average value of this output should be a constant voltage of known, calibration value. If the average output of counter 25 does not equal the calibration value, error exists in the transmitter modulation characteristic. Error is detected by comparing the output of counter 25 with a reference voltage in a comparator 26 which passes the difference between the two inputs to a chopper amplifier and phase detector 27.

The chopper amplifier and phase detector circuit 27 is employed to highly amplify the direct voltage output of comparator 26 in A.C. coupled amplifiers and to reconvert the amplified A.C. signal to a direct voltage of proper sense. The drift in the operating point associated with direct coupled amplifiers is thereby eliminated. The error signal output of circuit 27 is then used to control the output amplitude of a square wave generator 28.

The triangular waveform generator operates by integrating the square wave input from generator 28. Consequently the slope of the triangular modulating waveform is dependent upon the amplitude of the square wave input to generator 12. A wobbulation generator 31 varies the frequency of generator 28 by a small amount to eliminate the step errors previously mentioned.

The sense of the amplitude control voltage applied to square wave generator 28 is such that the square wave amplitude is reduced whenever the frequency of the audio signal applied to counter 25 exceeds the calibration value and increased for audio signals lower than the calibration value. This closed loop action maintains the average frequency of the audio signal constant at the calibration value. Further, since the process operates continuously, the accuracy of the actual altitude measurements of the instrument is guaranteed throughout the entire range of the instrument.

The integrity of these circuits of the instruments is monitored by extracting a portion of the audio signal from amplifier 24 and applying the same to a band pass filter 32, and to a frequency counter 33, which is identical to counter 25. A comparator 34, again identical to comparator 26, receives the output of counter 33 and a reference voltage equal to that applied to comparator 26 but derived from a separate source. The output of comparator 34 should be zero, or very close thereto, due to the high gain of amplifier 27. The output of comparator 34 is tested in an error detector 35 for departure from a tolerable value and should this departure exist a signal from the error detector causes the actuation of a warning flag in the altitude indicator.

Filter 32 passes a band of audio frequency signals centered on the calibration frequency, nominally 6 kc./s. for one particular design, that is expected to be present from the known delay of delay line 22 and the design modulation characteristic. The amplitude of signal passing through filter 32 is determined in a detector 36 and as long as it remains at an acceptably high level, detector 36 inhibits the appearance of the warning flag in the altitude indicator.

Filter 32 and detector 36 therefore test not only the proper operation of the delay line 22, mixer 23 and amplifier 24, they also determine that the self-calibration loop including counter 25, comparator 26 and the amplifier and phase detector 27 even though functioning properly, are not approaching the limits of control.

The description of the means for developing an altitude indication will now continue. Certain elements of these means are found in equivalent form in the prior art. The output signal of mixer 17 is amplified at 37 and passed through a low pass filter 38. The characteristics of filter 38 are variable as a function of signal strength. The filter time constant and consequently the corner frequency of the attenuation characteristic changes with low signal strengths to adjust the filter time constant towards a lower value, enabling the filter to pass a wider spectrum of the output from amplifier 37. High signal strength causes the filter time constant to be increased, thus narrowing the filter pass band to the point where the filter attenuates the signal to the desired level. This arrangement eliminates the conventional form of automatic gain control used in receivers. The particular advantage is that the spectrum of frequencies applied to the counter circuits is narrowed as the aircraft approaches the ground, consequently the counters function more accurately as the need for accuracy increases.

Following the low pass filter 38 is an equalization network 39. This network is a treble-boost type with a 6 db/octave rising characteristic. Compensation for loss of signal strength with increasing altitude is thus provided. Another filter 40 follows network 38 for the purpose of eliminating frequencies resulting from the leakage of the transmitted signal directly from the transmitter antenna to the receiver antenna. The leakage frequency is lower than any altitude frequency, hence filter 40 is a high-pass type adjusted to attenuate all frequencies equal to or lower than the frequency corresponding to the distance separating the transmitting and receiving antennas.

Signals passed by filter 40 are amplified at 41 and then applied to a signal level detector 42, one output of which is fed back to control the characteristics of filter 38; to a leakage signal amplifier 43; and to identical frequency counter circuits 44 and 45. Detector 42, in addition to controlling the characteristics of filter 38, provides an output indicative of the integrity of the system as well as the reliability of the signal. As long as the output of the detector exceeds a certain threshold, assurance is given by the presence of detector output that the transmitter, receiver, antennas and connecting cables are complete for the processing of signals and that the received signal is of sufficient strength to insure accurate frequency counting. The signal at detector 42 may drop below the predetermined threshold either because of a fault in the system or because of weak ground returns. It is desirable to distinguish system faults from normal signal drop-outs since different reactions to each situation should occur. The leakage amplifier 43 and a leakage signal detector 46 afford means for distinguishing system faults from signal failures for want of sufficient ground return.

Leakage of signal directly from the transmitting antenna to the receiving antenna produces a constant low frequency signal, which, although attenuated by the filter 39, will always be present to some small degree in the output of amplifier 41 if no fault exists in the system. Amplifier 43 is tuned to amplify the low frequency leakage signal and the output thereof is threshold detected by detector 46. If the output of detector 42 falls below threshold due to weak ground return, the output of detector 46 nevertheless remains above threshold thereby indicating that the disappearance of output from detector 42 was not the result of a system fault. The output of detector 46 is applied to inhibit the appearance of an alarm flag in the altitude indicator. Disappearance of output from detector 46 therefore provides an indication of a system fault. Disappearance of output from detector 42 causes the altimeter to be disconnected from the aircraft autopilot input and causes the altitude indicator to be driven off scale, thus insuring that altitude indications likely to be in error will not be used, but no warning of system fault is given.

The identical frequency counters 44 and 45 independently convert the altitude related signal frequencies from amplifier 41 into analog voltages. These voltages are corrected by the addition of a small offset bias to account for the fixed delay in the cable connecting the antennas to the transmitter and the receiver, the height of the antennas at touchdown, etc. This bias is applied by circuit 48 which also includes means for applying a much larger bias (pointer up input) if there are indications of unreliable data or system faults.

The corrected outputs of counters 44 and 45 are amplified in identical driver circuits 51 and 52 and thence utilized, for example, as the altitude information signal to the aircraft autopilot, taken from driver 52 and as the command signal to the altitude indicator servo, taken from driver 51. The altitude indicator 53 is a conventional type in which a motor 54 is mechanically coupled to the arm of a feedback potentiometer 55 connected to a reference voltage source. The servo command signal, which is the altitude-related voltage from driver 51, is compared with the feedback voltage from potentiometer 55 in comparator 56 to produce an error signal. The error signal is amplified at 57 for the control of motor 54. Motor 54 adjusts the feedback potentiometer to produce a null at the input to amplifier 57 and in so doing carries the indicator pointer 58 to a position corresponding to the altitude of the aircraft.

The integrity and accuracy of the frequency counter and altitude indicator portions of the instrument are monitored by a comparator 61 and error detector 62. In normal operations with good signal present at the input to frequency counters 44 and 45, the outputs of both drivers 51 and 52 should closely agree. Even variations in power supply voltages should not cause disagreement between these outputs since both circuits are identical and are fed by a common source. Further, since the frequency counters receive the same input signal, agreement between the outputs of drivers 51 and 52 is even more likely to occur than would agreement between the outputs of a dual altimeter installation. Therefore, inequality between the outputs of drivers 51 and 52 results either from an unuseable signal input or from fault within the counter or driver circuits. The possibility of the difference between the outputs being due to poor input signal is eliminated by the "pointer-up" voltage applied through the delay correction circuit 48 by the action of signal level detector 42. The "pointer-up" voltage is greater than the altitude voltage from counters 44 and 45 at the maximum range of the instrument, consequently the indicator pointer 58 will be driven off the upper end of the altitude scale. The outputs of drivers 51 and 52 should nevertheless agree, absent fault in a counter or driver circuit, because the same "pointer-up" voltage is applied to both drivers. Comparator 61 and error detector 62 will not then cause the appearance of the warning flag, yet the erroneous altitude data cannot be read because of the off scale position of the indicator pointer.

The altimeter may function perfectly up the point of delivering the altitude voltage to the indicator 53. If a fault should lie in the indicator servo, false altitude data could be indicated to the aircraft pilot. The integrity of the indicator servo including motor 54, feedback potentiometer 55, comparator 56 and amplifier 57 is monitored by a null detector 63. If, because of fault in these circuits, motor 54 does not cause the voltage from feedback potentiometer 55 to follow properly the applied altitude voltage, the inputs to comparator 56 will not balance and the output of amplifier 57 will be other than zero, except of course, for the small steady state error voltage present even in properly operating servos. Detector 63 senses outputs of amplifier 57 in excess of the normal error voltage and signals the fault by the actuation of the flag alarm.

Figures 2, 5:
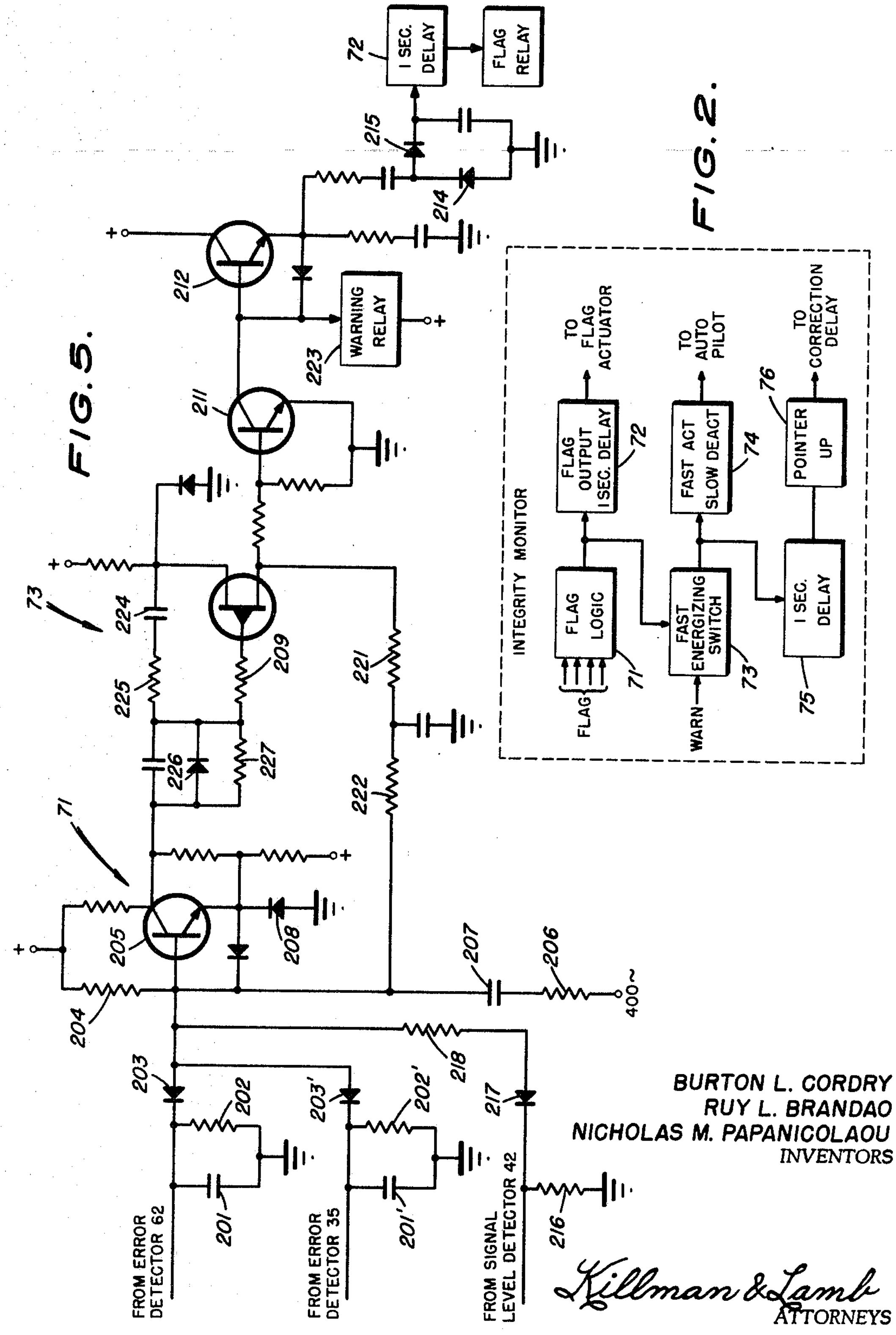
FIG. 5 is a schematic diagram of the warning and flag alarm logic circuit used in the invention.

The outputs of fault detectors 35, 36, 46, 62 and 63 are combined in the circuit of FIG. 2 to alert the pilot to the existence of system fault by display of the flag alarm. Since the fault detectors themselves may fail to function, all detectors are arranged to produce an output when the altimeter is operating normally. These outputs are combined in a logic circuit 71 of the NAND type where they serve to inhibit the production of a flag alarm signal. Disappearance of any one of the input signals to logic circuit 71 causes that circuit to actuate a fast energizing switch 73 and a flag output delay circuit 72, which, after a delay of one second, causes the flag alarm to appear. Switch 73 receives an alternative input from signal level detector 42. Upon the appearance of either input to switch 73, a fast acting switch 74 disconnects the aircraft autopilot from output driver 52. The output of switch 73 is also applied through a one-second delay circuit 75 to a pointer-up relay 76 which applies the pointer-up voltage to circuit 48, causing the indicator pointer to move off scale. If the fault is cleared or if the signal returns to strength, switch 73 is deactivated. The pointer-up voltage is removed from circuit 48 allowing the altitude voltage to be presented to the indicator, the warning flag is removed, and finally the autopilot is reconnected to the altimeter.

Figure 3:
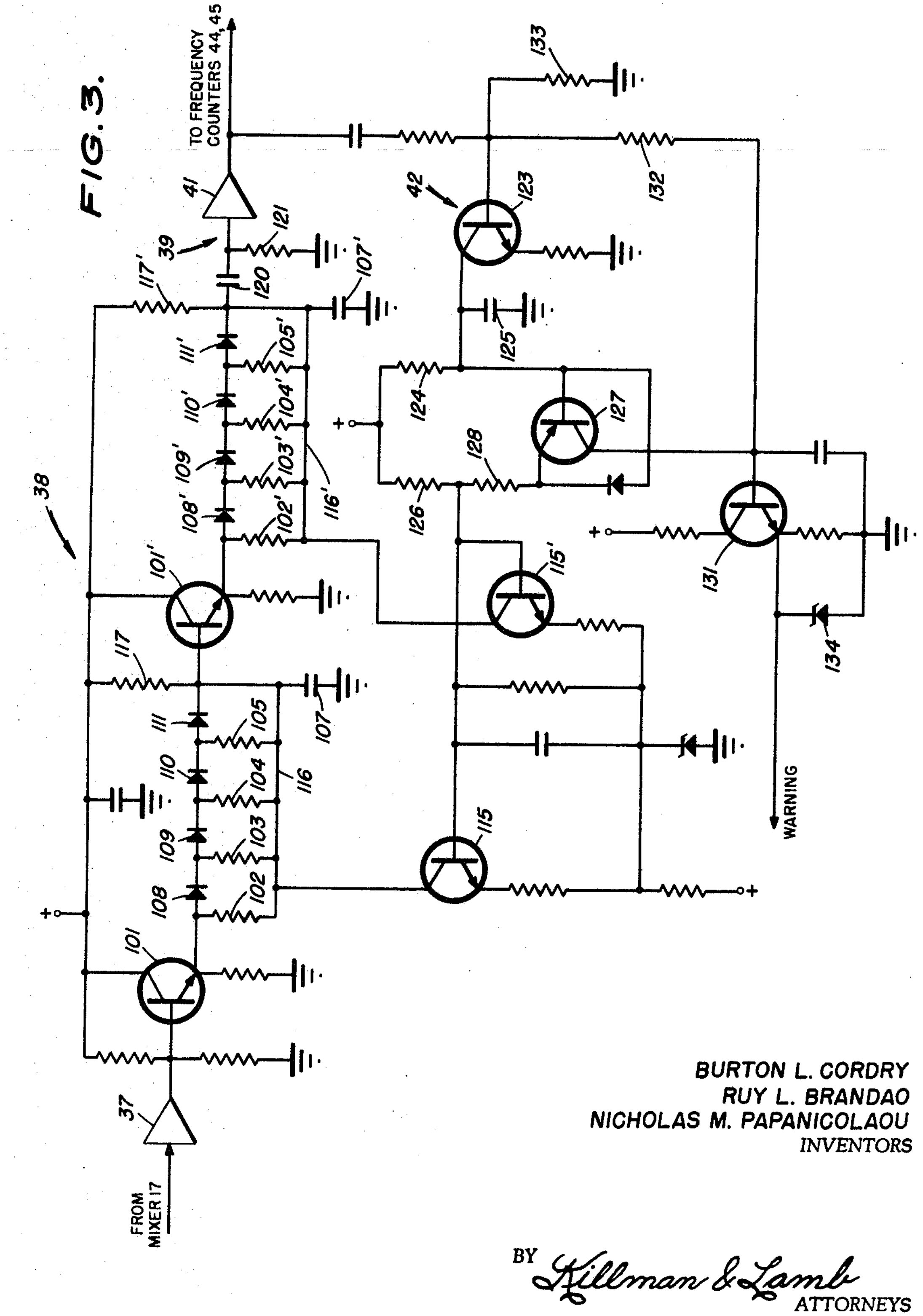
FIG. 3 is a schematic diagram of the variable band pass filter and related portions of the receiver used in the invention.
Figure 4:
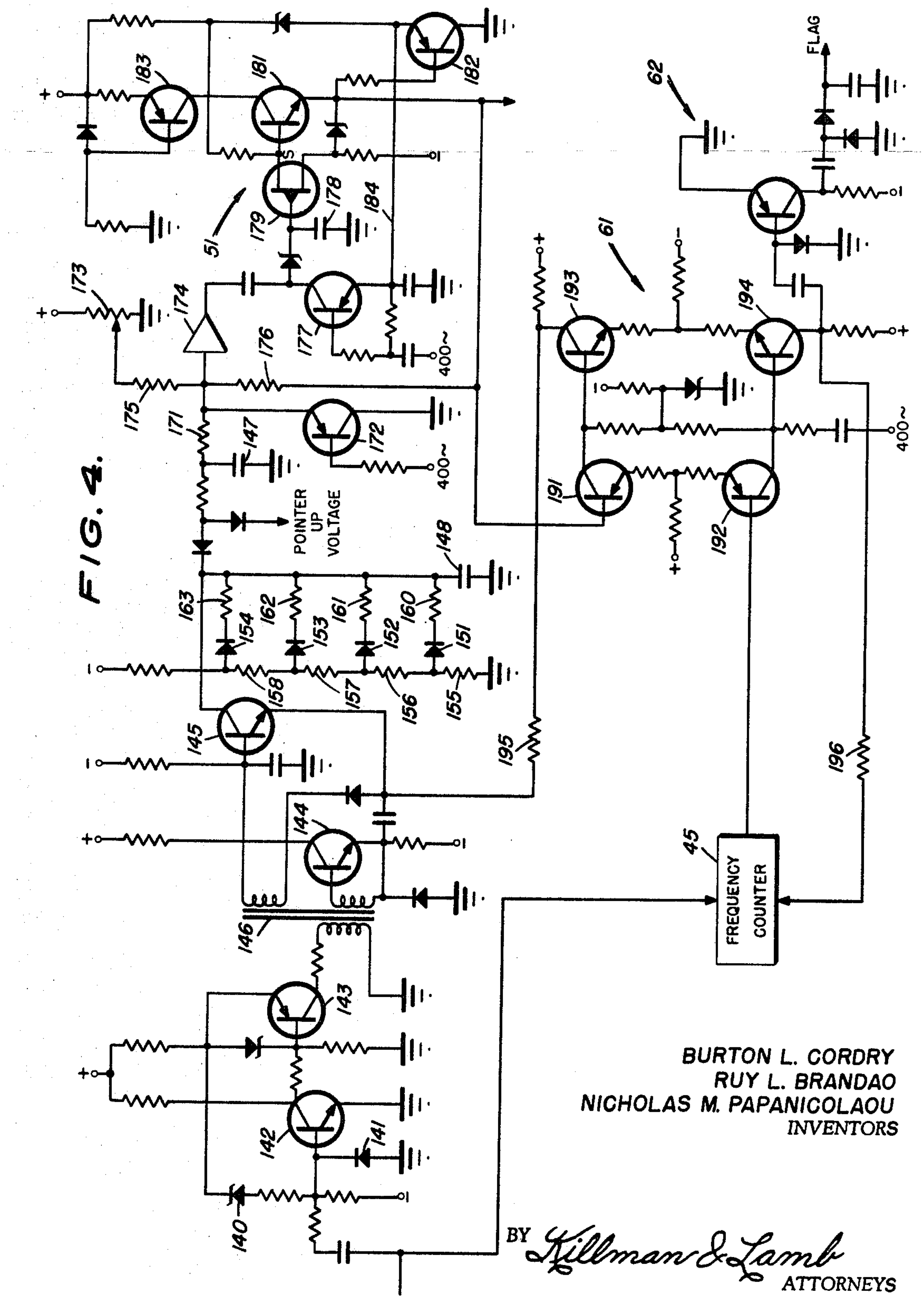
FIG. 4 is a schematic diagram of the frequency counter, comparator and error detector used in the invention.

FIGS. 3, 4 and 5 illustrate details of the circuits contributing to the novelty of the system. FIG. 3 is a schematic diagram of the variable frequency filter 38 and the control means therefor. Signal from amplifier 37 is applied to a transistor 101 connected as an emitter follower. Signal then passes into the first section of a dual section RC filter. Each filter section provides attenuation at the rate of 6 db/octave with the corner frequency being determined by the filter time constant. The time constant of the first filter section is the product of the parallel resistance of resistors 102–105 effectively connected in series with capacitor 107. Diodes 108–111 are connected to control the successive shunting of resistors 103–105 with resistor 102 as the diodes are rendered successively conductive. Successive conduction of diodes 108–111 is controlled by regulating the current flow through transistor 115, the collector of which is connected to the common lead 116 joining resistors 102–105 to capacitor 107 and which is supplied current from the positive source through transistor 101, resistor 102 and any other of resistors 103–105 effectively in circuit, and through resistor 117. The impedance of transistor 115 looking into the collector is very high, so signal is not shunted from the common conductor 116. Also the resistance of resistor 117 is very much higher than the combined source impedance of transistor 101 and the resistance of resistor 102. Because of this inequality in the impedances in the current paths to the collector of transistor 115, the current will largely be supplied through transistor 101 but the voltage on line 116 will be equal to the difference between the source voltage and the voltage drop across resistor 117. Thus as current is varied through transistor 115, very little change occurs in the emitter voltage of transistor 101, but a very large change occurs in the voltage drop across resistor 117. Suppose no current is drawn by transistor 115, the voltage on the cathodes of each of the diodes 108–111 then equals the supply voltage while their anode voltage is at a lower value as established by the biasing of transistor 101. Diodes 108–111 are then reverse biased with the result that the signal path must be from the emitter of transistor 101 through resistor 102 to capacitor 107. The time constant of the filter section is then determined by the product of the values of resistor 102 and capacitor 107. If now current is drawn by transistor 115 the emitter voltage of transistor 101 changes a negligible amount while the voltage on line 116 changes substantially. When the voltage on line 116 equals the emitter voltage of transistor 101, diodes 108–111 do not yet conduct because of the fixed turn-on voltage, usually about 0.5 v., required of each diode. When transistor 115 draws sufficient current to drop the voltage on line 116 approximately 0.5 v. below the emitter voltage of transistor 101, diode 108 becomes conductive, effectively connecting resistor 103 in parallel with resistor 102 and decreasing the time constant of the filter section. Diodes 109–111 still are not conductive because the 0.5 v. difference between the emitter voltage and the voltage on line 116 is absorbed by diode 108. When current through transistor 115 is further increased to produce a voltage difference of approximately one volt between the emitter of transistor 101 and line 116, turn-on voltage exists for diodes 108 and 109 but not for diodes 110 and 111. The filter section time constant is further reduced by the paralleling of resistor 104 with resistors 102 and 103. Additional reductions in the time constant occur as current through transistor 115 is increased to the point of turning on diode 110 and then diode 111.

Signal from the first filter section proceeds through the second filter section which includes a transistor 101′, resistors 102′–105′, diodes 108′–111′ and capacitor 107′ connected in the same manner as corresponding elements of the first filter section. A transistor 115′ regulates current drawn through the common line 116′ to set the time constant of the second filter section at the same value as that of the first filter section. From the second section of filter 38 signal passes into the equalization network 39 comprising capacitor 120 and resistor 121 and then into amplifier 41 for amplification prior to frequency counting. Signal from amplifier 41 is applied to the signal level detector 42 which comprises a transistor 123 operating without forward bias. Positive half-cycles of the signal tend to increase conduction through transistor 123 and produce a voltage drop across a collector load resistor 124. Smoothing of the rectified signal pulses is provided by a capacitor 125 so that the collector voltage of transistor 123 becomes proportional to the average value of the applied signal. Initially, transistors 115 and 115′ are biased for maximum conduction through a resistor 126 connected from the positive supply to their bases. The base of transistor 127 is connected to the collector of transistor 123 and the emitter is connected through resistor 128 to resistor 126. When transistor 123 is not conducting, or only lightly so, its collector voltage is higher than the base voltage of transistors 115, 115′. Transistor 127 is then reverse biased, while transistors 115 and 115′ continue to conduct at the maximum current. Under these circumstances diodes 108–111 and 108′–111′ are all conductive, setting the time constant of filter 38 at its lowest value. As the signal level rises current through transistor 123 increases, eventually reaching a point where its collector voltage is sufficiently lower than the base voltage of transistors 115 and 115' to permit conduction of transistor 127. Current flowing in transistor 127 increases the voltage drop across resistor 126 thereby reducing the base voltage of transistors 115 and 115', and the current flowing through the latter transistors. Further increase in signal strength further reduces conduction by transistors 115 and 115' with the result that diodes 108'–111' are successively cut off in reverse order, successively increasing the time constant of filter 38 and reducing the corner frequency of the filter. As the corner frequency of the filter is reduced the attenuation of the signal frequency increases, the signal amplitude at the input of amplifier 41 is reduced, likewise reducing signal applied to transistor 123 and further reduction in the current of transistors 115 and 115' is opposed. The signal amplitude at the output of amplifier 41 is thereby stabilized while noise components of higher frequency than the signal are attenuated.

Transistor 131 provides the warning signal whenever the signal amplitude drops below the useful level. The base of transistor 131 is connected to the collector of transistor 127. Whenever the latter is non-conductive, as it is when signals are below the acceptable threshold, transistor 131 is also non-conductive. The voltage at the emitter of transistor 131 is then zero representing the warning condition. Upon conduction the collected voltage of transistor 127 rises, tending to throw transistor 131 into conduction. To insure rapid transition of transistor 131 from a non-conductive to a conductive state, a small portion of the collector voltage of transistor 127 is fed back positively from the divided collector load resistors 132, 133 through transistor 123 to the base of transistor 127. When the signal level is sufficient to cause transistor 127 to commence to conduct, the feedback causes the transistor to conduct heavily enough at the outset to drive transistor 131 into saturation. The emitter volage of transistor 131 rises suddenly to the level determined by zener diode 134 to remove the warning condition.

The frequency counter 44, comparator 61, and error detector 62 appear schematically in FIG. 4. These circuits are typical of circuits performing similar functions elsewhere in the system. The altitude signal from amplifier 41, which exceeds an amplitude threshold established by zener diode 140 and diode 141, is applied to transistors 142 and 143 connected as a hysteresis switch. The output of transistor 143 drives a pulse generator including transistors 144 and 145 regeneratively coupled through a transformer 146. The pulse generator produces pulses of uniform duration and amplitude at a rate equal to the frequency of the altitude signal. These pulses are integrated in capacitors 147 and 148 to provide a voltage proportional to frequency. A shaping network comprising diodes 151–154 and resistors 160–163 is provided to alter the functional relationship of the integrated voltage to frequency. For lower values of the integrated voltage representing altitudes from 0–500 feet, a linear relationship between voltage and frequency is desired. For altitudes between 500 and 2500 feet, a logarithmic relationship between integrated voltage and frequency is desired. The lattice arrangement of diodes 151–154 and resistors 155–163 is calculated to progressively reduce the time constant and steady state attenuation factor of the integration network which includes capacitor 148 by shunting the capacitor with progressively smaller value resistors. Resistors 155–159 form a voltage divider which applies increasingly greater magnitudes of reverse bias to diodes 151–154. As long as the magnitude of the voltage accumulated in capacitor 146 is less than the magnitude of the negative voltage applied to the anode of diode 151, the time constant of the integration network will be determined by the source impedance of transistor 145 and the value of capacitor 148. When the pulse frequency corresponds to 500 feet, the voltage accumulated by capacitor 148 is sufficient to overcome the reverse bias on diode 151 and resistor 160 is effectively connected in shunt with capacitor 146, reducing the network time constant and causing the network to perform less in the manner of a true integrator. Response of the network to input frequency is therefore reduced. At a still higher altitude and pulse frequency, sufficient voltage will be accumulated in capacitor 148 to overcome the reverse bias of diode 152 and resistor 161 is effectively connected in shunt with capacitor 148 and resistor 160. Additional reduction in the response of the network to input frequency occurs. Further reductions occur as diodes 153 and 154 successively conduct, thus providing the desired linear-logarithmic response.

The voltage on capacitor 148 appears also on capacitor 147. This voltage, together with a bias voltage from a potentiometer 173 and the frequency counter output voltage are all added at the input to an amplifier 174. Voltage from capacitor 147 is applied through resistor 171. The bias voltage, which serves to correct for aircraft installation delays, is applied through resistor 175, while the frequency counter output voltage is applied through a feedback resistor 176. Amplifier 174 is coupled for A.C. amplification. A transistor 172 connected as a switch driven at 400 c.p.s. converts the direct current present at the input to amplifier 174 to alternating current. Transistor 177 at the output of amplifier 174, is also driven at 400 c.p.s. for synchronously rectifying the amplifier output. The rectified output of amplifier 174 appears on capacitor 178. The voltage on capacitor 178 is coupled through a field-effect transistor 179, providing very high input impedance, to the output driver 51. Driver 51 includes transistors 181 and 182 as direct coupled amplifiers, and transistor 183 as a current limiter for short circuit protection. Detector 177 is referenced to the driver output voltage by the bootstrap connection, line 184, thus reducing the voltage swing required of amplifier 174. The circuit commencing with resistor 171 through the output of driver 51 will be recognized as akin to an operational amplifier with the feedback loop closed at the input to amplifier 174. Neglecting the bias voltage from potentiometer 173, the driver output voltage accurately follows the voltage on capacitor 147 with a gain determined by the ratio of the values of resistor 176 to resistor 171, and this relationship holds true even though the load on the driver varies widely.

The frequency counter 45 is identical to the frequency counter 44 just described. Normally both counters produce equal outputs. Failure of one of the counters will produce an imbalance of the counter outputs. The inequality is detected in comparator 61 which is arranged to produce an output normally and to cause the output to disappear under abnormal conditions. Not only the integrity of the counter circuits, but also that of the comparator are monitored in this manner. Comparator 61 comprises transistor 191–194 connected as a differential amplifier with inputs to the bases of transistors 191 and 192 from the outputs of counters 44 and 45, respectively. Signal from a 400 c.p.s. source is applied to the base of transistor 194, where it is normally amplified and applied to the error detector 62. When the outputs of counters 44 and 45 are equal, or different by a tolerable amount, transistors 191 and 192 conduct equally, or approximately equally, resulting in approximately equal conduction for transistors 193 and 194. The 400 c.p.s. signal is then amplified by transistor 194 and passed to the detector 62. When the outputs of counters 44 and 45 differ by more than a tolerable amount, transistor 191 will conduct more heavily than transistor 192, or vice versa, depending upon which counter output is greater in magnitude. Transistors 193 and 194 are then either cut off or saturated, but in either condition no amplification of the 400 c.p.s. signal can occur in transistor 194 and output from detector 62 will disappear. Disappearance of output from detector 62 triggers the system alarm. In order to minimize small differences between the counters and permit relaxation of certain tolerances within the counter, a negative feedback loop is closed from the outputs of transistors 193 and 194 through feedback resistors 195 and 196. The feedback has the beneficial effect of averaging small errors of counters 44 and 45.

Referring to FIG. 5, the outputs from error detectors 62, 35, etc., are combined in the self-testing logic circuit 71. For simplicity, only the inputs to the logic from detectors 62 and 35 are shown since the inputs from the remaining detectors are identical. The input to the logic from each detector is applied to a filter network comprising a shunt connected capacitor 201 and resistor 202. A diode 203, biased in the forward direction by current through resistor 204, separates each of the input networks from the base of transistor 205. Signal from a 400 c.p.s. source is differentiated by resistor 206 and capacitor 207 to provide alternating spike pulses at the base of transistor 205. Under normal conditions, the output of each of the error detectors 62, 35, etc. is a positive voltage sufficiently greater than the positive voltage on the anodes of diodes 203, 203′ to reverse bias those diodes. The filter networks 201–202, 201′–202′ are thus effectively isolated from the base of transistor 205 and the 400 c.p.s. pulses present there. Whenever a fault causes the output from any of the error detectors 62, 35, etc. to disappear, the diode 203 or 203′ connected to the faulted detector conducts, effectively connecting one of the filter networks 201–202 or 201′–202′ to the base of transistor 205. Two events then occur. The 400 c.p.s. pulses are filtered from the base of transistor 205 and no longer appear at its output and the bias at the base of transistor 205 changes from a level established by zener diode 208 to a level determined by the voltage division between resistor 204 and the filter resistor 202 or 202′ effectively connected to the transistor base.

Normally, 400 c.p.s. pulses are passed by transistor 205 to a field-effect transistor 209 for further amplification, then by a warning relay driver transistor 211 to transistor 212 and detected by diodes 214 and 215. The detected pulses provide a direct voltage which prevents the actuation of the flag relay. Abnormal conditions, resulting from a system fault detected by one of the error detectors 62, 35, etc. or from an internal failure of the logic circuit and circuits following to diode 215 cause the inhibiting voltage to be removed from the flag relay and the flag alarm to appear.

Another function of the logic circuit 71 is to distinguish between a system fault signalled by one of the error detectors and loss of ground return signalled by the signal level detector 42. In the latter event, the altitude indicator is driven off scale, but the flag alarm does not appear. The logic circuit distinguishes between these conditions by means of the separate connection of detector 42 to resistor 216, thence through diode 217 and resistor 218 to the base of transistor 205. Diode 217, like diodes 203, 203′ is biased in the forward direction through resistor 204. When the ground returns are strong enough to provide reliable altitude indications, the signal level detector 42 provides a positive voltage output greater than the anode voltage of diode 217, reverse biasing the diode. The base bias of transistor 205 is then determined by zener diode 208. If the ground return drop below the useful threshold, the output from detector 42 disappears and diode 217 becomes conductive. The base bias of transistor 205 changes from the value determined by diode 208 to the value determined by the voltage division between resistors 216, 218 and 204. However, unlike the change in the input conditions of transistor 205 which occurs with conduction of diodes 203 or 203′ conduction of diode 217 does not eliminate the 400 c.p.s. pulses at the base because of the high impedance through resistors 216 and 218 to ground. Although the collector current of transistor 205 is altered by conduction of diode 217, at least one polarity of the 400 c.p.s. pulses will be passed by transistor 205 and the circuits following to be detected and inhibit the operation of the flag alarm relay. The change in the direct current component of the output of transistor 205 is amplified in transistor 209 and fed back in a positive sense through resistors 221 and 222 to transistor 205 to speed the transition in the D.C. level. The change in the direct voltage component of the output of transistor 209 shifts the bias at the base of transistor 211 causing the direct current output of that transistor to change and actuate the warning relay 223. The function of the warning relay has been described. Upon restoration of signal strength, the warning relay is not immediately deactivated, but is sustained in the warning position for approximately one second. This delay is generated by the negative feedback path from the drain electrode of transistor 209 to its gate through capacitor 224 and resistor 225. Capacitor 224 charges rapidly through diode 226 to provide quick response of the warning relay to loss of ground returns. The discharge path of capacitor 224 must include the additional resistance of resistor 227, considerably lengthening the time constant of the feedback network and delaying response of transistor 209 to the restoration of normal output from transistor 205.

Obviously the invention may be practiced otherwise than as specifically disclosed. It is to be understood that the invention is limited solely by the scope of the appended claims.

The invention claimed is:

1. In a self-calibrating radio altimeter of the FM-CW type an improvement comprising
- means for generating a continuous radio frequency wave,
- means for frequency modulating said continuous wave,
- a delay line to which said modulated wave is applied,
- mixing means for producing a difference frequency between said modulated wave and delayed waves from said delay line,
- means for measuring the frequency of said difference frequency,
- reference means providing an output analogous to the difference frequency obtained by mixing a continuous wave with a predetermined modulation characteristic and the same wave traveling a distance equivalent to the propagation delay of said delay line,
- means for comparing said measured difference frequency with said reference means output to provide an error signal; and
- means responsive to said error signal for controlling said frequency modulating means to cause reduction of said error signal.

2. Apparatus as claimed in claim 1 with additional means duplicating said difference frequency measurement means;
- additional means duplicating said reference means;
- additional means duplicating said comparing means to provide a duplicate error signal, and
- a fault detector responsive to the magnitude of said duplicate error signal for generating an alarm whenever the magnitude of said duplicate error signal exceeds a predetermined value.

3. Apparatus as claimed in claim 1 with additionally, a filter to which said difference frequency is applied, said filter being of the band pass type for attenuating frequencies outside a predetermined pass band, and
- a fault detector for generating an alarm whenever the output of said filter drops below a predetermined value.

4. Apparatus as claimed in claim 3 together with additional means duplicating said difference frequency measurement means;
- additional means duplicating said reference means;
- additional means duplicating said comparing means to provide a duplicate error signal, and
- a fault detector responsive to the magnitude of said duplicate error signal for generating an alarm whenever the magnitude of said duplicate error signal exceeds a predetermined value.

5. A radio altimeter of the FM-CW type comprising,
a transmitter including modulation means for generating a frequency modulated continuous radio wave;
a transmitting antenna for radiating said modulated wave;
a receiving antenna;
a receiver including mixing means for combining the output signal from said transmitter with signals from said receiving antenna to provide difference frequency signals, the frequencies of which are representative of the path length traveled by signals from said transmitting antenna to said receiving antenna;
a filter for selecting certain of said difference frequency signals, said filter being of the low pass type with a variable cut-off frequency characteristic;
means responsive to the strength of said difference frequency signals for controlling the cut-off frequency of said filter; and
means for measuring the frequency of difference frequency signals passed by said filter to provide an output related to the path length traveled by the received signal giving rise to the measured difference frequency signal.

6. An altimeter as claimed in claim 5 with additionally means controlled by said signal strength responsive means for generating a warning signal whenever signal strength drops below a predetermined value.

7. An altimeter as claimed in claim 5 with additionally, amplifying means tuned to the difference frequency representing the length of the direct path between said transmitting antenna and said receiving antenna and means for generating an alarm signal whenever the output of said amplifying means drops below a predetermined level.

8. An altimeter as claimed in claim 7 with additionally, self-calibration means including:
a delay line to which signal from said transmitter is directly applied,
second mixing means combining signal directly from said transmitter with delayed transmitter signals from said delay line to develop a calibration difference frequency dependent upon the propagation delay of said delay line and the modulation characteristic of said transmitter,
means providing a reference standard representative of the difference frequency obtained with known propagation delay and a predetermined modulation characteristic,
means comparing said calibration difference frequency with said reference standard to produce an error signal,
means responsive to said error signal for controlling said transmitter modulation means to cause reduction of said error signal.

9. An altimeter as claimed in claim 8 with additionally filter means arranged to pass a band of said calibration difference frequencies centered about a predetermined calibration frequency, and
means for generating an alarm whenever signals passed by said filter means fall below a predetermined level.

10. An altimeter as claimed in claim 9 with additionally,
duplicate reference means substantially identical to said first named reference means,
duplicate comparing means substantially identical to said first named comparing means for comparing said calibration difference frequency with output from said duplicate reference means to provide a duplicate error signal, and
means responsive to the magnitude of said duplicate error signal for generating an alarm whenever said duplicate error signal exceeds a predetermined value.

11. An altimeter as claimed in claim 10, with additionally,
duplicate means for measuring the frequency of difference frequency signals passed by said filter, said duplicate frequency measuring means being substantially identical to said first named frequency measuring means,
means for comparing the outputs of said first named frequency measuring means and said second named frequency measuring means to provide the difference therebetween, and
means responsive to the magnitude of said difference between said frequency measuring means outputs for generating an alarm whenever said difference exceeds a predetermined amount.

12. An altimeter as claimed in claim 11 wherein said means for generating an alarm in response to the level of signal traveling directly from transmitting to receiving antenna, said means for generating an alarm in response to the level of said calibration difference frequency, said means for generating an alarm in response to the level of said duplicate error signal, and said means for generating an alarm in response to the magnitude of said difference between outputs of said frequency measuring means, each produce an output in the absence of conditions demanding an alarm; and wherein said altimeter includes
logic means receiving the outputs of said alarm generating means for producing the alarm in the absence of any of said outputs.

13. An altimeter as claimed in claim 12, wherein said logic means includes
an amplifier;
means applying a pulsating signal to the input of said amplifier;
means for detecting pulsating signal output from said amplifier, the output of said detecting means serving to inhibit the production of an alarm; and
filter means at the input to said amplifier and controlled by said outputs of said alarm generating means for attenuating the pulsating signal at said amplifier input upon the disappearance of output from any one of said alarm generating means.

14. A radio altimeter as claimed in claim 5 wherein said filter and said means for controlling the cut-off frequency of said filter comprises:
a plurality of series connected diodes, said difference frequency signals being applied to one end of said series;
a capacitor connected from the other end of said series to electrical ground;
a common conductor connected to said other end of said series;
a plurality of resistors each connected from said common conductor to junctions of individual diodes of said series;
means applying a biasing potential to said other end of said series; and
means responsive to the strength of said difference frequency signals for varying said bias potential to render said diodes successively non-conductive with increasing signal strength thereby to increase the time constant of said filter.

15. An altimeter as claimed in claim 11 with additionally,
means for applying a portion of the output of said comparing means to said first and second named frequency measuring means in negative feedback relationship for the purpose of reducing any difference between the outputs of said frequency measuring means.

16. An altimeter as claimed in claim 15 wherein said first and second named frequency measuring means each comprise
means receiving said difference frequency signals for shaping the same into pulses of uniform amplitude and duration,
integrating means for storing said shaped pulses thereby providing an output proportional to pulse frequency, and a feedback type amplifier providing an output which is the algebraic sum of the output of said integrating means and that portion of said output of said comparison means supplied to said frequency measuring means, said feedback amplifier output constituting the output of said frequency measuring means.

References Cited

UNITED STATES PATENTS

| | | | |
|---|---|---|---|
| 3,196,437 | 7/1965 | Mortley et al. | 343—17.2 |
| 3,248,729 | 4/1966 | Howard et al. | 343—14 X |

RODNEY D. BENNETT, *Primary Examiner.*

J. P. MORRIS, *Assistant Examiner.*